United States Patent
Kawamura et al.

(10) Patent No.: US 9,487,178 B2
(45) Date of Patent: Nov. 8, 2016

(54) HEAD-PROTECTING AIRBAG DEVICE AND METHOD OF FOLDING AIRBAG THEREOF

(71) Applicants: TOYODA GOSEI CO., LTD., Kiyosu-shi, Aichi (JP); TOYOTA JIDOSHA KABUSHIKI KAISHA, Toyota-shi, Aichi (JP)

(72) Inventors: Koji Kawamura, Kiyosu (JP); Taizo Suemitsu, Kiyosu (JP); Atsushi Kashio, Kiyosu (JP); Mitsuhiro Hamada, Toyota (JP)

(73) Assignees: TOYODA GOSEI CO., LTD., Aichi-pref (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/759,984

(22) PCT Filed: Dec. 2, 2013

(86) PCT No.: PCT/JP2013/082374
§ 371 (c)(1),
(2) Date: Jul. 9, 2015

(87) PCT Pub. No.: WO2014/132513
PCT Pub. Date: Sep. 4, 2014

(65) Prior Publication Data
US 2015/0336531 A1 Nov. 26, 2015

(30) Foreign Application Priority Data
Feb. 28, 2013 (JP) .................... 2013-039158

(51) Int. Cl.
*B60R 21/232* (2011.01)
*B60R 21/237* (2006.01)

(52) U.S. Cl.
CPC .......... *B60R 21/232* (2013.01); *B60R 21/237* (2013.01)

(58) Field of Classification Search
CPC .................... B60R 21/232; B60R 21/237
USPC ........................................... 280/730.2
See application file for complete search history.

(56) References Cited

U.S. PATENT DOCUMENTS 7,325,826 B2 * 2/2008 Noguchi ............... B60R 21/232
280/730.2
2002/0027341 A1 * 3/2002 Bakhsh ................ B60R 21/232
280/730.2

(Continued)

FOREIGN PATENT DOCUMENTS

JP 2002-331901 A 11/2002
JP 2003-341464 A 12/2003

(Continued)

OTHER PUBLICATIONS

International Search Report of the International Searching Authority mailed Mar. 4, 2014 for the corresponding international application No. PCT/JP2013/082374 (and English translation).

*Primary Examiner* — Keith Frisby
(74) *Attorney, Agent, or Firm* — Posz Law Group, PLC

(57) ABSTRACT

A head-protecting airbag device includes an airbag that is inflatable in such a manner as to separate an inboard side wall and an outboard side wall while unfolding downward from a housing. The airbag includes a front inflatable shielding region that covers an inboard side of a window and includes a sub inflatable region that is inflatable later than the main inflatable region. The sub inflatable region includes a supportive inflatable region that is supported by a vehicle body member which is disposed below a beltline. The airbag is stored in the housing such that a front lower corner of the sub inflatable region is folded inward on a crease extending obliquely rearward and downward from the front edge to the lower edge of the airbag before the airbag is subjected to a vertical size reducing folding that brings the lower edge as unfolded flatly close to the upper edge.

14 Claims, 7 Drawing Sheets

(56) References Cited

U.S. PATENT DOCUMENTS

| | | |
|---|---|---|
| 2002/0167154 A1 | 11/2002 | Nakanishi |
| 2007/0138778 A1 | 6/2007 | Takemura et al. |
| 2009/0058049 A1* | 3/2009 | Villarreal .............. B60R 21/232 280/728.2 |
| 2009/0256336 A1 | 10/2009 | Takemura et al. |
| 2012/0139215 A1* | 6/2012 | Heuschmid ........... B60R 21/233 280/730.2 |
| 2012/0248751 A1 | 10/2012 | Kato et al. |
| 2012/0256402 A1 | 10/2012 | Kato et al. |
| 2013/0270805 A1* | 10/2013 | Kruse ................... B60R 21/232 280/730.2 |

FOREIGN PATENT DOCUMENTS

| | | | |
|---|---|---|---|
| JP | 2004-66969 A | 3/2004 | |
| JP | 2006-88919 A | 4/2006 | |
| JP | 2007-161167 A | 6/2007 | |
| JP | 2010-201998 A | 9/2010 | |
| JP | 2012-201312 A | 10/2012 | |
| JP | 2013203127 A * | 10/2013 | ........... B60R 21/237 |

* cited by examiner

HEAD-PROTECTING AIRBAG DEVICE AND METHOD OF FOLDING AIRBAG THEREOF

CROSS REFERENCE TO RELATED APPLICATION

This application is a U.S. national stage application of PCT/JP2013/082374 filed on Dec. 2, 2013, and is based on Japanese Patent Application No. 2013-039158 filed on Feb. 28, 2013, the entire contents of which are incorporated herein by reference.

TECHNICAL FIELD

The present invention relates to a head-protecting airbag device having an airbag that is mountable on an upper periphery of a window at an inboard side of a vehicle in a folded-up configuration and is so deployable as to cover the window when fed with an inflation gas in order to catch and arrest an occupant inside the vehicle and prevent the occupant from being ejected out of the vehicle in the event of a rollover of the vehicle, and to a method of folding such an airbag.

BACKGROUND ART

A conventional head-protecting airbag device having an airbag which is capable of arresting an occupant inside a vehicle in the event of a rollover of the vehicle is known, by way of example, from the Patent Document 1 listed below. In the head-protecting airbag device, the airbag includes a main inflatable region and a sub inflatable region that is in communication with the main inflatable region and completes inflation after the main inflatable region has completed inflation. The sub inflatable region includes a supportive inflatable region that is located at the lower end of the sub inflatable region as fully inflated and is adapted to be supported by a vehicle body member disposed below a beltline of a vehicle window.

With such a head-protecting airbag device, an occupant is arrested inside the vehicle smoothly in the event of rollover of the vehicle since the supportive inflatable portion is supported by the vehicle body member disposed below the beltline and prevents the airbag from moving out of the vehicle.

In another conventional head-protecting airbag device disclosed in the Patent Document 2, by way of example, the lower end of a sub inflatable region of an airbag is folded over an inboard side of an inboard side wall of the airbag, and then the whole airbag is folded up by rolling or the like and stored in a storage area disposed at the upper periphery of a vehicle window.

PRIOR ART DOCUMENTS

Patent Documents

Patent Document 1: JP2012-201312A
Patent Document 2: JP2007-161167A

DISCLOSURE OF INVENTION

Technical Problem

In the head-protecting airbag device of the Patent Document 1, the airbag is inflated in the event of a side impact of a vehicle as well. However, if the vehicle body member disposed below the beltline is pushed in or intrudes towards an inboard direction in the event of side impact, the lower end region of the sub inflatable region of the airbag may land on the vehicle body member instead of being deployed at an inboard side of the vehicle body member, and that may cause bending of the airbag and failure in covering the window adequately.

With the head-protecting airbag device of the Patent Document 2, since the sub inflatable region is folded over the inboard side wall of the airbag in the initial step of airbag folding, the sub inflatable region will be deployed at an inboard side of the vehicle body member even if the vehicle body side member is pushed in or intrudes toward an inboard direction in the event of a side impact of the vehicle. Therefore, the airbag will be prevented from being disposed on top of the vehicle body member and bending.

However, with the airbag of the Patent Document 2, if the head of an occupant is located close to the window at a side impact where the airbag needs to catch the occupant at an earlier timing than at a rollover, the airbag may have difficulty in deploying a vicinity of the sub inflatable portion between the head and the window since the whole lower periphery of the sub inflatable region is folded over the inboard side wall of the airbag in the initial step of airbag folding. That is, in such circumstances, the airbag of the Patent Document 2 may fail to exert an adequate deployment property to thrust itself into a space between the head and window.

The present invention has been contemplated to solve the above-mentioned problems, and one of the objects of the invention is to provide a head-protecting airbag device that exerts a good occupant arresting property and a good deployment property of an airbag in the event of a rollover of a vehicle. Another object of the invention is to provide a method of folding such an airbag.

Solution to Problem

The head-protecting airbag device according to the invention includes a housing adapted to be mounted on an upper periphery of a window disposed at a side of a front seat of a vehicle and an airbag that is stored in the housing in such a configuration that is folded up through a vertical size reducing folding that brings a lower edge of the airbag as unfolded flatly close to an upper edge of the airbag. The airbag includes a front inflatable shielding region that is inflatable with an inflation gas fed from an inflator in such a manner as to separate an inboard side wall and an outboard side wall while unfolding downward from the housing for covering an inboard side of the window. The front inflatable shielding region includes a main inflatable region and a sub inflatable region that is disposed in front of the main inflatable region and is in communication with the main inflatable region and completes inflation after the main inflatable region has completed inflation. The sub inflatable region includes at the lower end as fully inflated a supportive inflatable region that is deployable at and supported by an inboard side of a vehicle body member of the vehicle which is disposed below a beltline of the window at full inflation of the airbag. Prior to the vertical size reducing folding, the airbag has been subjected to an inward folding that folds a front lower corner of the sub inflatable region as unfolded flatly on a crease extending obliquely rearward and downward from a front edge to the lower edge of the airbag and locates the front lower corner of the sub inflatable region at a position on an inboard side of the inboard side wall deployable above the beltline.

When the airbag of the head-protecting airbag device of the invention admits an inflation gas, the airbag deploys from the housing while unfolding in a reverse fashion to the folding process. In the final stage of unfolding, the front lower corner of the sub inflatable region of the front inflatable shielding region, which was subjected to the inward folding, unfolds and inflates in such a manner as to overlap with the inboard side of the vehicle body member disposed below the beltline of the window. With the configuration of the invention, even if the vehicle body member is pushed in or intrudes towards an inboard direction, the sub inflatable region will smoothly deploy at an inboard side of the vehicle body member disposed below the beltline including the supportive inflatable region at the lower end, and inflate and gain thickness. Thus the front inflatable shielding region of the airbag will not move out of the vehicle easily and exert a desired occupant arresting performance, thereby arresting an occupant inside the vehicle adequately in the event of a rollover.

The region of the airbag folded towards the inboard side wall in the initial step of airbag folding is the front lower corner of the sub inflatable region located in front of the main inflatable region of the front inflatable shielding region, in other words, the region to the front edge of the airbag located in front of the main inflatable region which is inflatable in the event of a side impact of the vehicle. With this configuration, if the head of an occupant is positioned close to the window in the initial stage of airbag inflation in the event of a side impact, a vicinity of the front lower corner of the sub inflatable region in a folded state will hardly engage with the head of the occupant. Even if part of the front lower corner area of the sub inflatable region should engage with the occupant, it would be a small triangular region disposed at a rear region of the folded-back region, and the triangular region will go into a space between the head of the occupant and the window easily. As a consequence, the airbag will be unfolded in the whole area to the lower edge of the front inflatable shielding region, and exert a good deployment property.

Therefore, with the head-protecting airbag device according to the invention, the airbag will exert a good occupant arresting property and a good deployment property in the event of a rollover of a vehicle.

In the head-protecting airbag device of the invention, it is desired that the vertical size reducing folding is mainly composed of an outward rolling that rolls a region of the airbag to the lower edge towards the outboard side wall.

If the airbag is folded up with such a vertical size reducing folding, the airbag will easily unroll along the window and exert a steady deployment property when undoing the vertical size reducing folding.

In the head-protecting airbag device of the invention, it is further desired that:

the airbag further includes at the upper edge thereof a plurality of mounting portions adapted to be mounted on a vehicle body member disposed at the upper periphery of the window;

a foremost mounting portion out of the mounting portions is located at the front edge of the airbag; and the crease of the inward folding is formed into such a straight line that an upper end thereof is located in a vicinity of immediately below the foremost mounting portion while a lower end thereof is located at the rear of a rear lower corner of a lower end of the sub inflatable region, thus extends from immediately below the foremost mounting portion and passes through the rear lower corner of the lower end of the sub inflatable region.

With this configuration, the region folded inward secures a wide area in an area of the sub inflatable region without folding the main inflatable region, and even in an instance where an intruding amount of the vehicle body member in the event of a side impact is great, the sub inflatable region will be able to deploy the supportive inflatable region at an inboard side of the vehicle body member.

In the head-protecting airbag device of the invention, it will also be appreciated that the crease of the inward folding may be so formed as to extend obliquely rearward and downward at an inclination angle of 45° from the front edge to the lower edge of the airbag so as to locate the lower end of the crease at a vicinity of an intermediate in a front and rear direction of the sub inflatable region.

In the head-protecting airbag device of the invention, moreover, prior to the outward rolling in the vertical size reducing folding, a lower peripheral region of the airbag having been subjected to the inward folding may be folded towards the outboard side wall on a crease extending in a front and rear direction.

The straight crease formed by the outward folding will facilitate the subsequent outward rolling since a jig used to help the outward rolling (in particular, a jig which suctions an entire area around the crease of the outward folding and rolls the area) will be smoothly applied to the straight crease.

In the head-protecting airbag device of the invention, furthermore, it is desired that:

the airbag further includes a rear inflatable shielding region that is disposed at the rear of the front inflatable shielding region and a communication passage that is disposed in the upper edge at a vicinity of a center in a front and rear direction of the airbag as fully inflated and provides communication between the front inflatable shielding region and the rear inflatable shielding region; and an upper half area in an up and down direction of the communication passage is folded up in a bellows fashion on creases extending in a front and rear direction.

The bellows-folding will enable the communication passage to unfold more quickly when fed with an inflation gas, compared with an outward rolling, and to provide communication between the front inflatable shielding region and rear inflatable shielding region such that the inflatable shielding regions inflate swiftly.

The method of folding an airbag according to the invention is the method of folding an airbag for use in a head-protecting airbag device having a housing adapted to be mounted on upper peripheries of windows at a side of a front seat and a rear seat of a vehicle, in order to store the airbag in the housing, the airbag including;

a front inflatable shielding region and a rear inflatable shielding region that are inflatable with an inflation gas fed from an inflator in such a manner as to separate an inboard side wall and an outboard side wall while unfolding downward from the housing for covering an inboard side of the windows at a side of the front seat and rear seat, the front inflatable shielding region including a main inflatable region and a sub inflatable region that is disposed in front of the main inflatable region and is in communication with the main inflatable region and completes inflation after the main inflatable region has completed inflation, the sub inflatable region including at a lower end thereof as fully inflated a supportive inflatable region that is deployable at and supported by an inboard side of a vehicle body member which is disposed below a beltline of the window at full inflation of the airbag; and a communication passage that is disposed in an upper edge at a vicinity of a center in a front and rear direction of the airbag as fully inflated and provides communication between the front inflatable shielding region and the rear inflatable shielding region. The method of folding includes:

a vertical size reducing folding step that brings a lower edge of the airbag as unfolded flatly close to an upper edge of the airbag; and an inward folding step that is conducted prior to the vertical size reducing folding step and folds a front lower corner of the sub inflatable region as unfolded flatly on a crease extending obliquely rearward and downward from a front edge to the lower edge of the airbag and locates the front lower corner of the sub inflatable region at a position on an inboard side of the inboard side wall deployable above the beltline.

With the method of folding of the invention, when the airbag stored in the housing in a folded-up configuration admits an inflation gas, the airbag deploys from the housing while unfolding in a reverse fashion to the folding process. In the final stage of unfolding, the front lower corner of the sub inflatable region of the front inflatable shielding region, which was subjected to the inward folding, unfolds and inflates in such a manner as to overlap with the inboard side of the vehicle body member disposed below the beltline of the window. With the configuration, even if the vehicle body member is pushed in or intrudes towards an inboard direction, the sub inflatable region will smoothly deploy at an inboard side of the vehicle body member disposed below the beltline including the supportive inflatable region at the lower end, and inflate and gain thickness. Thus the front inflatable shielding region of the airbag will not move out of the vehicle easily and exert a desired occupant arresting performance, thereby arresting an occupant inside the vehicle adequately in the event of a rollover.

The region of the airbag folded towards the inboard side wall in the initial step of airbag folding is the front lower corner of the sub inflatable region located in front of the main inflatable region of the front inflatable shielding region, in other words, the region to the front edge of the airbag located in front of the main inflatable region which is inflatable in the event of a side impact of the vehicle. With this configuration, if the head of an occupant is positioned close to the window in the initial stage of airbag inflation in the event of a side impact, a vicinity of the front lower corner of the sub inflatable region in a folded state will hardly engage with the head of the occupant. Even if part of the front lower corner area of the sub inflatable region should engage with the occupant, it would be a small triangular region disposed at a rear region of the folded-back region, and the triangular region will go into a space between the head of the occupant and the window easily. As a consequence, the airbag will be unfolded in the whole area to the lower edge of the front inflatable shielding region, and exert a good deployment property.

Therefore, with the method of folding an airbag according to the invention, the airbag will exert a good occupant arresting property and a good deployment property in the event of a rollover of a vehicle.

In the method of folding an airbag of the invention, it is desired that the vertical size reducing folding step is mainly composed of an outward rolling step that rolls a region of the airbag to the lower edge towards the outboard side wall.

If the airbag is folded up with such a vertical size reducing folding step, the airbag will easily unfold along the window and exert a steady deployment property when undoing the vertical size reducing folding.

In the method of folding an airbag of the invention, it is desired that the outward rolling step is applied to an area of the airbag from the lower edge to a vicinity of a center of a width in an up and down direction of the communication passage.

With this configuration, an entire area of the airbag, i.e., an entire area from a vicinity of the center of the width in an up and down direction of the communication passage to the lower edge, is rolled outwardly. Accordingly, the airbag will further easily unroll along the windows and exert a steady deployment property.

In the method of folding an airbag of the invention, the vertical size reducing folding step desirably further includes, prior to the outward rolling step, a lower-periphery outward folding step that folds a lower peripheral region of the airbag having been subjected to the inward folding towards the outboard side wall on a crease extending in a front and rear direction.

The straight crease formed by the lower-periphery outward folding will facilitate the subsequent outward rolling since a jig used to help the outward rolling (in particular, a jig which suctions an entire area around the crease of the outward folding and rolls the area) will be smoothly applied to the straight crease.

In the method of folding an airbag of the invention, furthermore, the vertical size reducing folding step desirably further includes a bellows-folding step that folds an upper half area of the communication passage in a bellows fashion on creases extending in a front and rear direction.

The bellows-folding will enable the communication passage to unfold more quickly when fed with an inflation gas, compared with an outward rolling, and to provide communication between the front inflatable shielding region and rear inflatable shielding region such that the inflatable shielding regions inflate swiftly.

DESCRIPTION OF EMBODIMENTS

Figure 1:
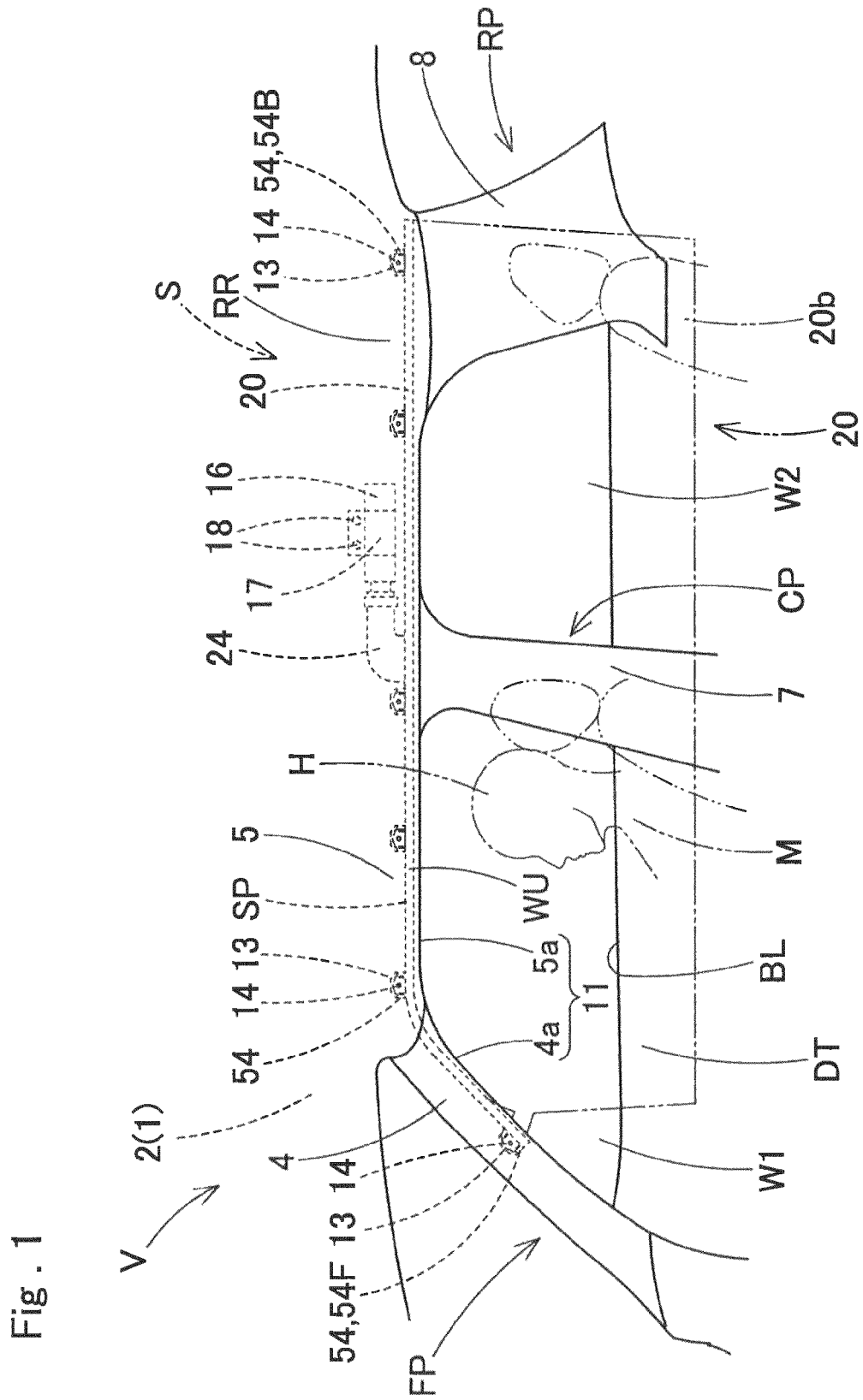
FIG. 1 is a side view of a head-protecting airbag device according to the first embodiment of the invention as is mounted on board and viewed from an interior of a vehicle.

Embodiments of the invention are now described with reference to the accompanying drawings. As shown in FIG. 1, the head-protecting airbag device S embodying the invention includes an airbag 20, an inflator 16 for feeding the airbag 20 with an inflation gas, an airbag cover 11, brackets 13, a bracket 17 and bolts 14 and 18. The airbag 20 is adapted to be stored in a folded-up configuration in a housing SP located on the upper peripheries WU of windows (side windows) W1 and W2 inside a vehicle V, which windows are disposed one behind the other at a side of a front seat and a rear seat of the vehicle V. Specifically, the airbag 20 is disposed at an area ranging from the lower periphery of a front pillar FP through the region above a rear pillar RP, via a region above a middle pillar CP.

As shown in FIG. 1, the inflator 16 has a substantially cylindrical shape and is inserted into an inlet port 24 of the airbag 20 for admitting an inflation gas, thus coupled with the airbag 20. The inflator 16 is held by the bracket 17 which is adapted to be bolt 18 fixed such that the inflator 16 is secured to an inner panel 2 at a location of a roof side rail RR in a vicinity of a region above the middle pillar CP, while being covered by a lower edge region 5a of a roof head liner 5. The inner panel 2 is part of a vehicle body structure 1.

The inflator 16 is so designed as to be actuated by a predetermined control device when it detects a rollover or a side impact of the vehicle V. The output of the inflator 16 is so determined that a later-described protection inflatable portion 26 of the airbag 20 maintain a predetermined internal pressure during a side impact and a subsequent rollover of the vehicle V, in accordance with a volume of the airbag 20.

The brackets 13 serve to mount later-described mounting portions 54 of the airbag 20 with the bolts 14. Each of the bolts 14 is to be fastened into a screw hole formed on the inner panel 2 and provided with a nut or the like.

As shown in FIG. 1, the airbag cover 11 is composed of a lower edge region 4a of a front pillar garnish 4 arranged on the front pillar FP and the lower edge region 5a of the roof head liner 5 arranged on the roof side rail RR, and covers an inboard side I of the airbag 20 stored in the housing SP in a folded-up configuration. The housing SP is formed on the inner panel 2 at the front pillar FP and roof side rail RR.

Figure 2:
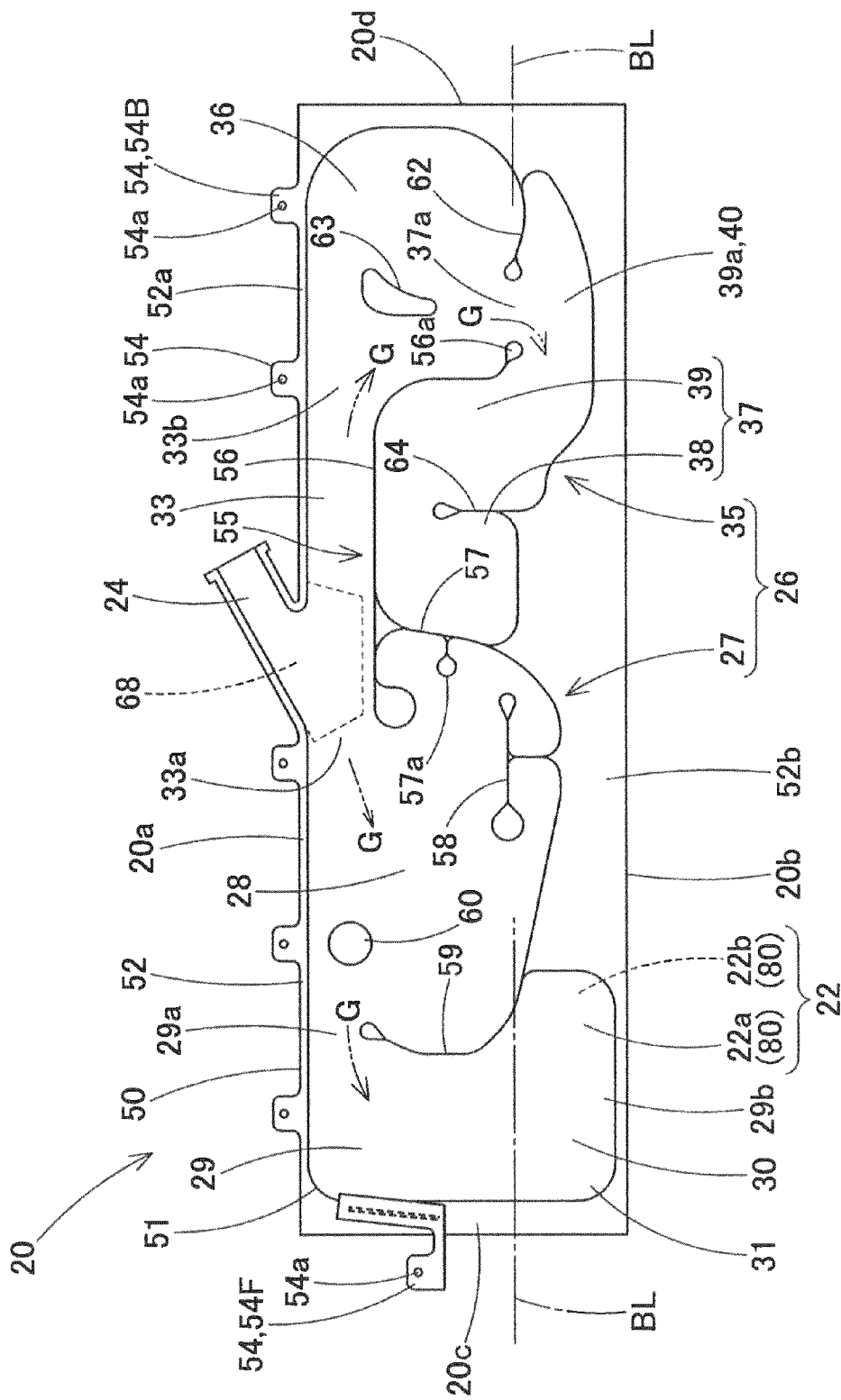
FIG. 2 is a front elevational view of an airbag for use in the head-protecting airbag device of the first embodiment in a flatly unfolded state.

The airbag 20 has such a flexibility as to be foldable. As shown in FIG. 2, the airbag 20 is a cut-and-sewn airbag made by sewing together an inboard side wall 22a and an outboard side wall 22b. The inboard side wall 22a and outboard side wall 22b are composed of a base cloth 80 of polyimide, polyester or the like. Sealing agent is applied to a jointed region 51 that sews the inboard side wall 22a and outboard side wall 22b together so as to improve gastightness of the airbag 20.

Figure 7:
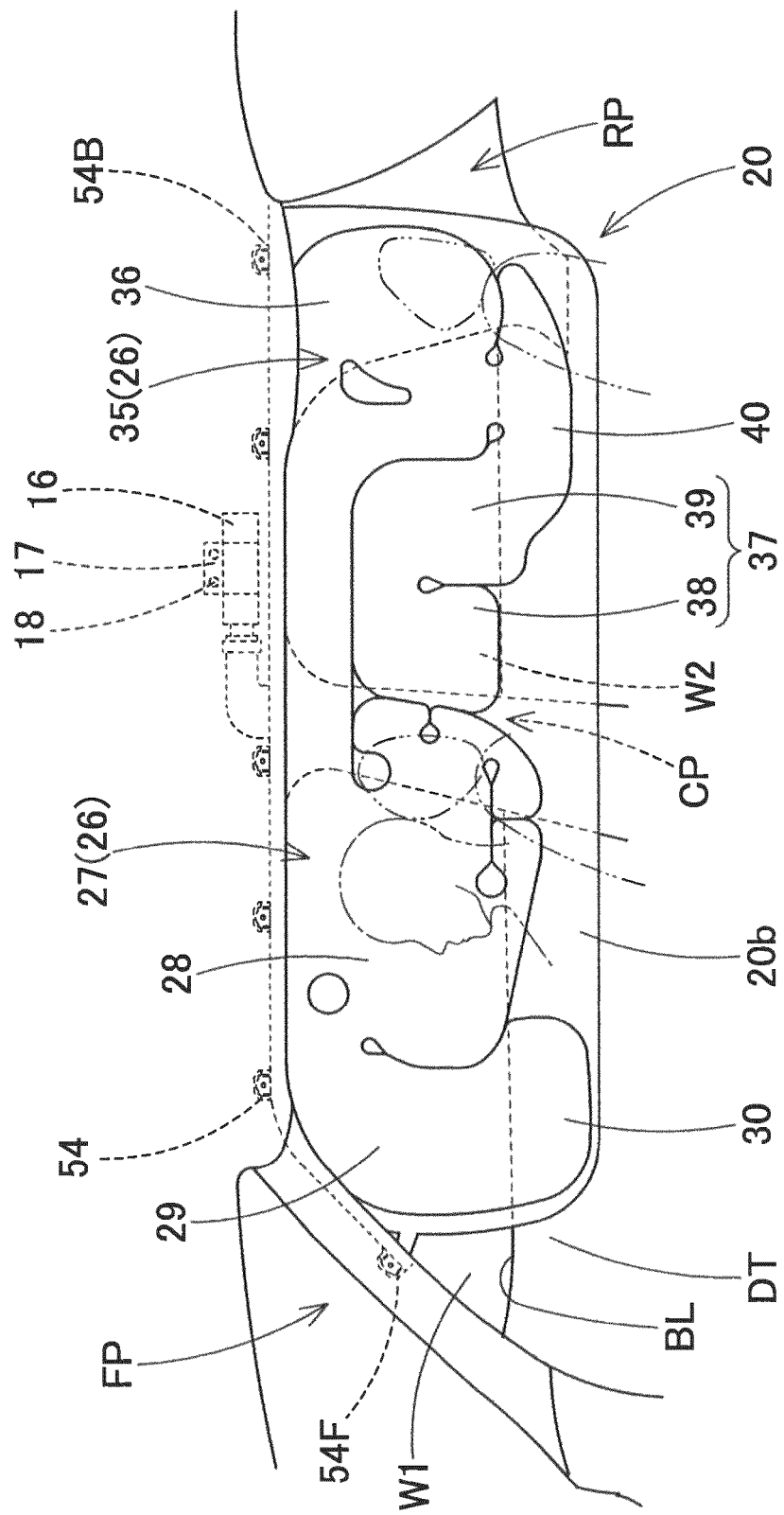
FIG. 7 is a side view of the head-protecting airbag device of the first embodiment having completed operation as viewed from an interior of a vehicle.

As shown in FIGS. 1 and 7, the airbag 20 is designed to unfold, when fed with an inflation gas G from the inflator 16, and deploy and cover an inboard side I of the windows W1 and W2, the middle pillar CP and the rear pillar RP. At deployment, the lower edge region 20b of the airbag 20 is supported by a vehicle body member DL which is disposed below the beltline BL of the windows W1 and W2 at an inboard side of the vehicle (i.e., by a door trim, in the illustrated embodiment).

Figure 6:
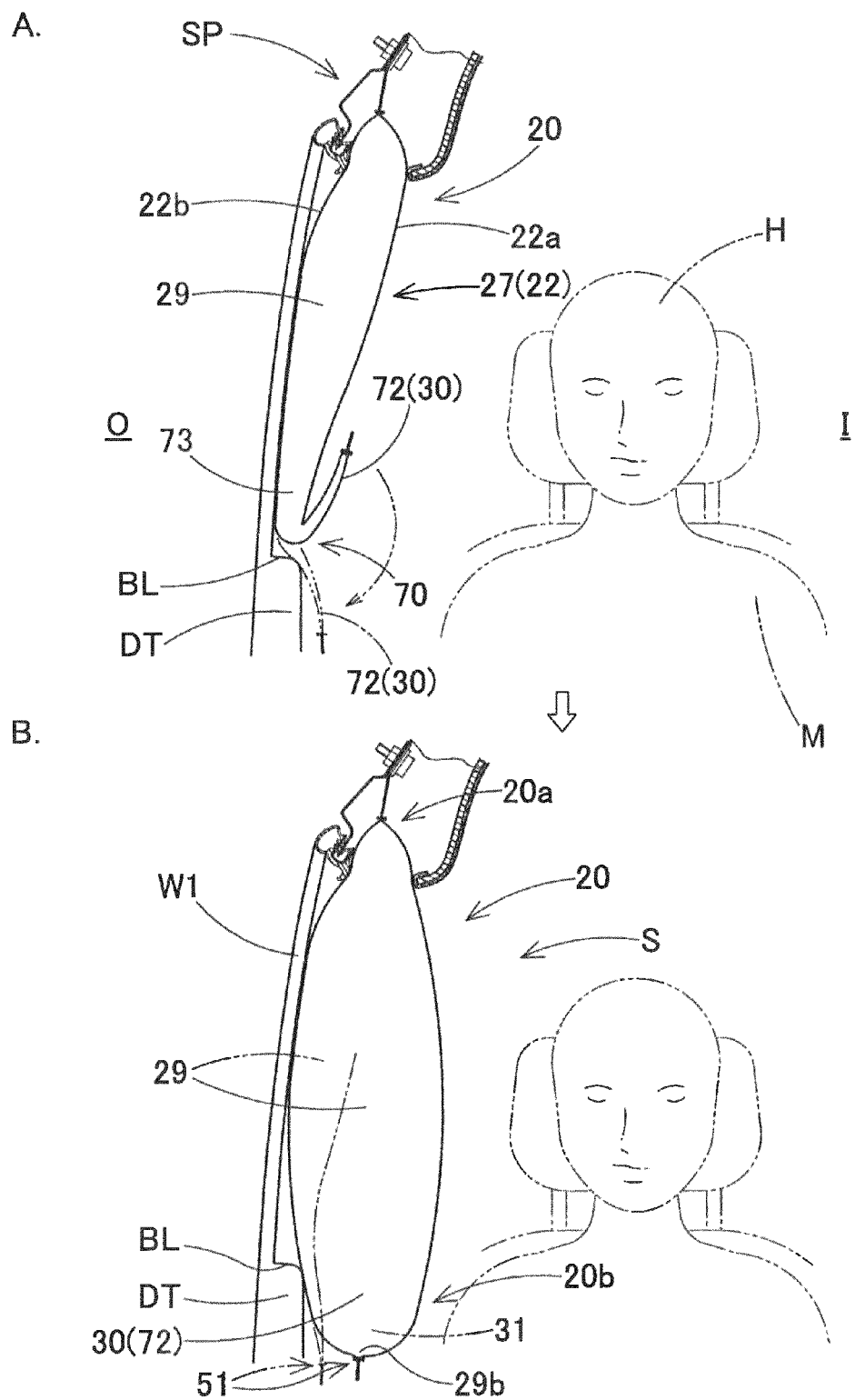
FIG. 6 shows schematic vertical sectional views showing the behavior of the head-protecting airbag device of the first embodiment at deployment, in particular, the behavior after FIG. 5.

As shown in FIGS. 2 and 6, the airbag 20 includes a gas admissive region 22 that is inflatable with an inflation gas G by separating an inboard side wall 22a and an outboard side wall 22b and a non-admissive region 50 that admits no inflation gas and keeps the inboard side panel 22a and outboard side panel 22b attached together at inflation.

The non-admissive region 50 includes the jointed region 51, a peripheral region 52 disposed around the jointed region 51 and mounting portions 54 disposed at the upper edge 52a of the peripheral region 52. The peripheral region 52 is arranged around the gas admissive region 22.

The mounting portions 54 are provided in plurality in such a manner as to project upward from the upper edge 52a of the peripheral region 52 in the upper edge 20a of the airbag 20. The airbag 20 of the illustrated embodiment includes six such mounting portions 54. Each of the mounting portions 54 is provided with a mounting hole 54a for receiving the bolt 14. As described above, the mounting portions 54 are coupled with the brackets 13 and secured to the inner panel 2 by the bolts 14 inserted through the mounting holes 54a and fastened into the screw holes of the inner panel 2. The foremost mounting portion 54F is formed by stitching a separate cloth member made of a woven fabric of polyamide or the like to the peripheral region 52 at the front edge 20c of the airbag 20. The mounting portion 54F is adapted to be secured to a vicinity of a lower region of the front pillar FP such that a strong tensile force is exerted at airbag deployment in the lower edge 20b of the airbag 20, specifically on a line connecting the mounting portion 54F and the rearmost mounting portion 54 (54B) apart from the front pillar FP, so as to improve the arresting property of the airbag 20 to arrest an occupant M inside the vehicle (FIG. 7).

The jointed region 51 defines the gas admissive region 22 as well as partitions the gas admissive region 22, and further extends into the gas admissive region 22 so as to regulate the thickness of the gas admissive region 22. The jointed region 51 includes partitioning portions 55, 59, 62 and 64 and thickness regulating portions 58, 60 and 63.

The center partitioning portion 55 partitions a later-described front inflatable shielding region 27 and a later-described rear inflatable shielding region 35 of the protection inflatable portion 26, and includes a horizontal partitioning section 56 formed into a generally T and a vertical partitioning section 57. The region between the horizontal partitioning section 56 and the upper edge 52a of the peripheral region 52 serves as a communication passage 33 that provides communication between the front inflatable shielding region 27 and the rear inflatable shielding region 35. The vertical partitioning section 57 includes a front overhang section 57a which extends forward.

The front partitioning portion 59 extends upward from the jointed region 51 at the lower edge 20b of the front inflatable shielding region 27 in such a manner as to partition a later-described main inflatable region 28 of the front inflatable shielding region 27 from a sub inflatable region 29.

The rear partitioning portion 62 extends forward from the jointed region 51 at the rear edge 20d of the airbag 20 in such a manner as to partition a later-described main inflatable region 36 of the rear inflatable shielding region 35 from a sub inflatable region 37. The dividing partitioning portion 64 extends upward from the jointed region 51 at the lower edge 20b of the airbag 20 in such a manner as to divide the sub inflatable region 37 of the rear inflatable shielding region 35 into front and rear.

The lower thickness regulating portion 58 and the front thickness regulating portion 60 regulate the thickness of the front inflatable shielding region 27. The lower thickness regulating portion 58 extends upward from the jointed region 51 at the lower edge 20b of the front inflatable shielding region 27 and the front thickness regulating portion 60 is formed separate from the peripheral region 52 in an area of the front inflatable shielding region 27.

The thickness regulating portion 60 is located proximate a later-described inlet 29a of the sub inflatable region 29 between the inlet 29a and the front end 33a of the communication passage 33 in order to prevent an inflation gas G heading forward from the front end 33a of the communication passage 33 from directly flowing into the sub inflatable region 29 via the inlet 29a.

The rear thickness regulating portion 63 regulates the thickness of the rear inflatable shielding region 35, and is formed separate from the peripheral region 52 in an area of the rear inflatable shielding region 35.

The gas admissive region 22 includes the inlet port 24 for connection with the inflator 16, the communication passage 33 and the protection inflatable region 26. An inner tube 68 is disposed inside the inlet port 24 for enhancing heat resistance.

The communication passage 33 is in communication with a lower region of the inlet port 24 and extends in a front and rear direction along the upper edge 20a of the airbag 20 in a vicinity of the center in a front and rear direction of the airbag 20 as inflated.

The protection inflatable region 26 is composed of a region of the gas admissive region 22 except the inlet port 24 and a vicinity of the communication passage 33, and includes the front inflatable shielding region 27 and rear inflatable shielding region 35. The front inflatable shielding region 27 and rear inflatable shielding region 35 are partitioned from each other by the center partitioning portion 55. At airbag deployment, the front inflatable shielding region 27 covers an inboard side of the window W1 at a side of the front seat (i.e., the front side window) of vehicle V and part of the middle pillar CP while the rear inflatable shielding region 35 covers an inboard side of the window W2 at a side of the rear seat (i.e., the rear side window) and the rear pillar RP (FIGS. 1 and 7).

The front inflatable shielding region 27 includes the main inflatable region 28 and the sub inflatable region 29 which are partitioned from each other by the front partitioning portion 59 and disposed one behind the other. The main inflatable region 28 is in communication with the front end 33a of the communication passage 33, and is located at an upper reach of an inflation gas G relative to the sub inflatable region 29, at the rear of the sub inflatable region 29, so as to inflate prior to the sub inflatable region 29 and protect the head H of an occupant M seated in the front seat in the event of a side impact. The sub inflatable region 29 adjoins the main inflatable region 28 in a front and rear direction and is inflatable so as to address a rollover of vehicle V.

The sub inflatable region 29 is a vertical cell extending in an up and down direction from the upper edge 20a up to the lower edge 20b of the airbag 20, and is inflatable into a generally rectangular plate. The sub inflatable region 29 is designed to admit an inflation gas G from an inlet 29a formed between the upper end of the front partitioning portion 59 and the jointed region 51 at the upper edge 20a of the airbag 20. The lower end region 29b of the sub inflatable region 29 serves as a supportive inflatable region 30 that is supported by an inboard side I of the vehicle body member (i.e., door trim) DT disposed below the beltline BL of the window W1 at full inflation of the airbag.

The rear inflatable shielding region 35 includes the main inflatable region 36 and the sub inflatable region 37 which are partitioned from each other by the rear partitioning portion 62 and a vicinity of the rear end 56a of the horizontal partitioning section 56 and disposed one behind the other. The main inflatable region 36 is in communication with the rear end 33b of the communication passage 33, and is located at an upper reach of an inflation gas G relative to the sub inflatable region 37, at the rear of the sub inflatable region 37, so as to inflate prior to the sub inflatable region 37 and protect the head H of an occupant M seated in the rear seat in the event of a side impact. The sub inflatable region 37 adjoins the main inflatable region 36 in a front and rear direction and is inflatable in front of the main inflatable region 36 so as to address a rollover of the vehicle V. The sub inflatable region 37 is divided into a front chamber 38 and a rear chamber 39 by the dividing partitioning portion 64, and the rear chamber 39 includes at the lower region an inflatable region 39a which extends rearward and communicates with the main inflatable region 36.

The sub inflatable region 37 is designed to admit an inflation gas G from an inlet 37a formed between the front end of the rear partitioning portion 62, which is located at the upper edge of the inflatable region 39a, and the rear end 56a of the horizontal partitioning portion 56. The inflatable region 39a serves as a supportive inflatable region 40 that is supported by an inboard side I of the vehicle body member (i.e., door trim) DT disposed below the beltline BL of the window W2 at full inflation of the airbag.

When the inflator 16 is actuated and feeds an inflation gas G into the airbag 20 via the inlet port 24 and communication passage 33, the main inflatable regions (i.e., primary inflatable regions) 28 and 36 complete inflation 20 to 30 ms after actuation of the inflator 16. Subsequently, the sub inflatable regions (i.e., the secondary inflatable regions) 29 and 37 admit inflation gas G via the inlets 29a and 37a from the main inflatable regions 28 and 36 and complete inflation 70 to 80 ms after actuation of the inflator 16. Thereafter, the airbag 20 maintains a fully inflated state as a whole until about 6 s after actuation of the inflator 16 in order to address a rollover of the vehicle V.

Mounting of the head-protecting airbag device S according to the foregoing embodiment on a vehicle V is now described. Firstly, the airbag 20 is folded up. The folding process of the airbag 20 includes an inward folding step and a vertical size reducing folding step. The vertical size reducing folding step includes a lower-periphery outward folding step, an outward rolling step and a bellows-folding step.

Figure 3:
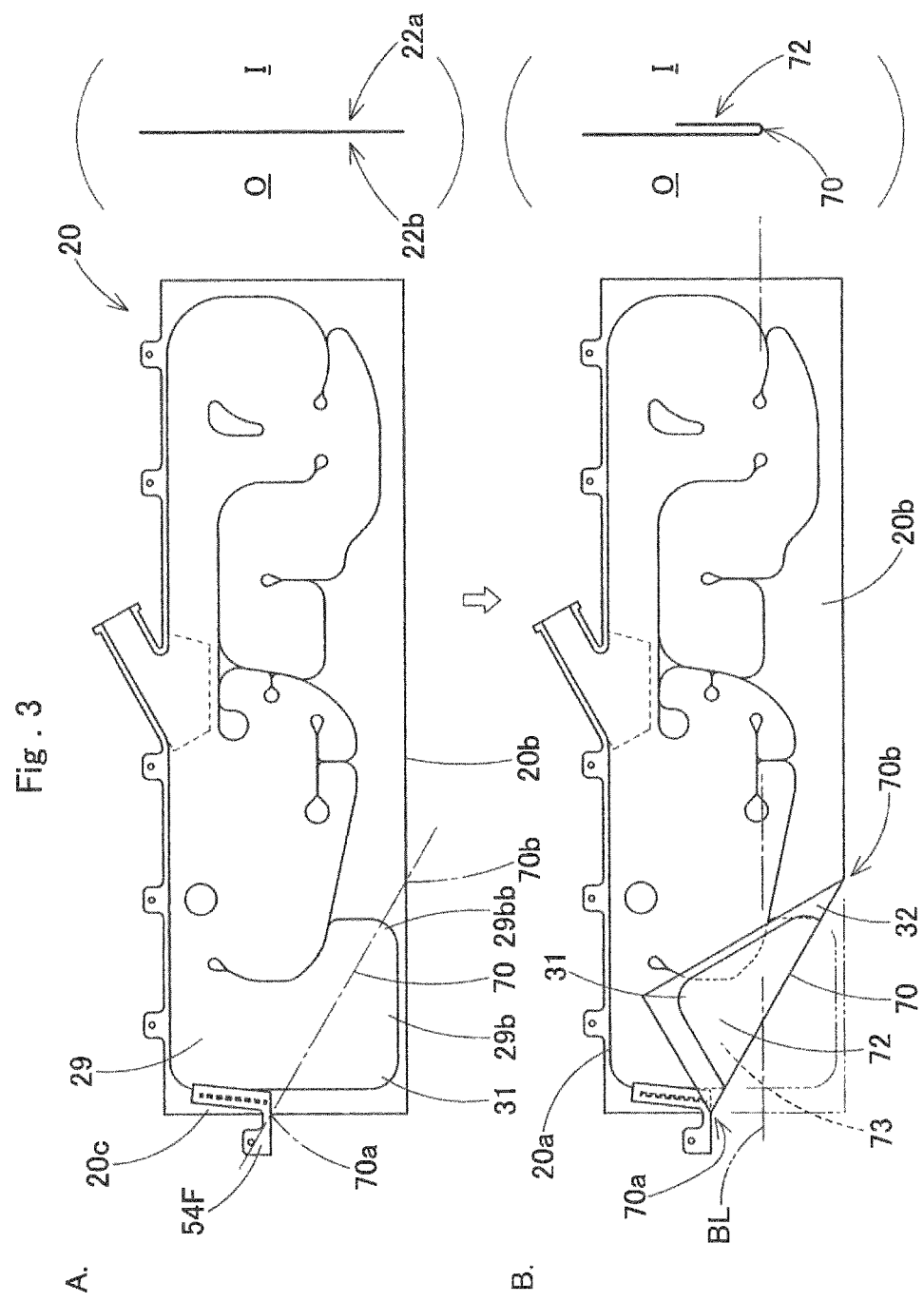
FIG. 3 illustrates a folding process of the airbag of the first embodiment, in particular, an inward folding step.

As shown in A, B of FIG. 3, in the inward folding step, an inward fold region 72, which is located at the front lower corner 31 of the sub inflatable region 29 in a flatly unfolded state (in a flatly spread out state), is folded over the inboard side wall 22a on a crease 70 which extends obliquely rearward and downward from the front edge 20c to the lower edge 20b of the airbag 20. At this time, the inward fold region 72 is overlaid on an inboard side I of an underneath region 73, which is positioned at an upper region of the sub inflatable region 29, such that the front lower corner 31 of the sub inflatable region 29 be located at a position of the flattened airbag 20 deployable above the beltline BL.

In the illustrated embodiment, the upper end 70a of the crease 70 is located in a vicinity of immediately below the foremost mounting portion 54F while the lower end 70b is located at the rear of the rear lower corner 29bb of the lower end 29b of the sub inflatable region 29. Thus, the crease 70 is a straight line extending from immediately below the foremost mounting portion 54F and passing through the rear lower corner 29bb. The crease 70 is so formed as to locate the front lower corner 31 at a vicinity of an intermediate between the beltline BL and the upper edge 20a of the airbag 20 and as to secure a wide area of the inward fold region 72 in an area of the sub inflatable region 29.

Figure 4:
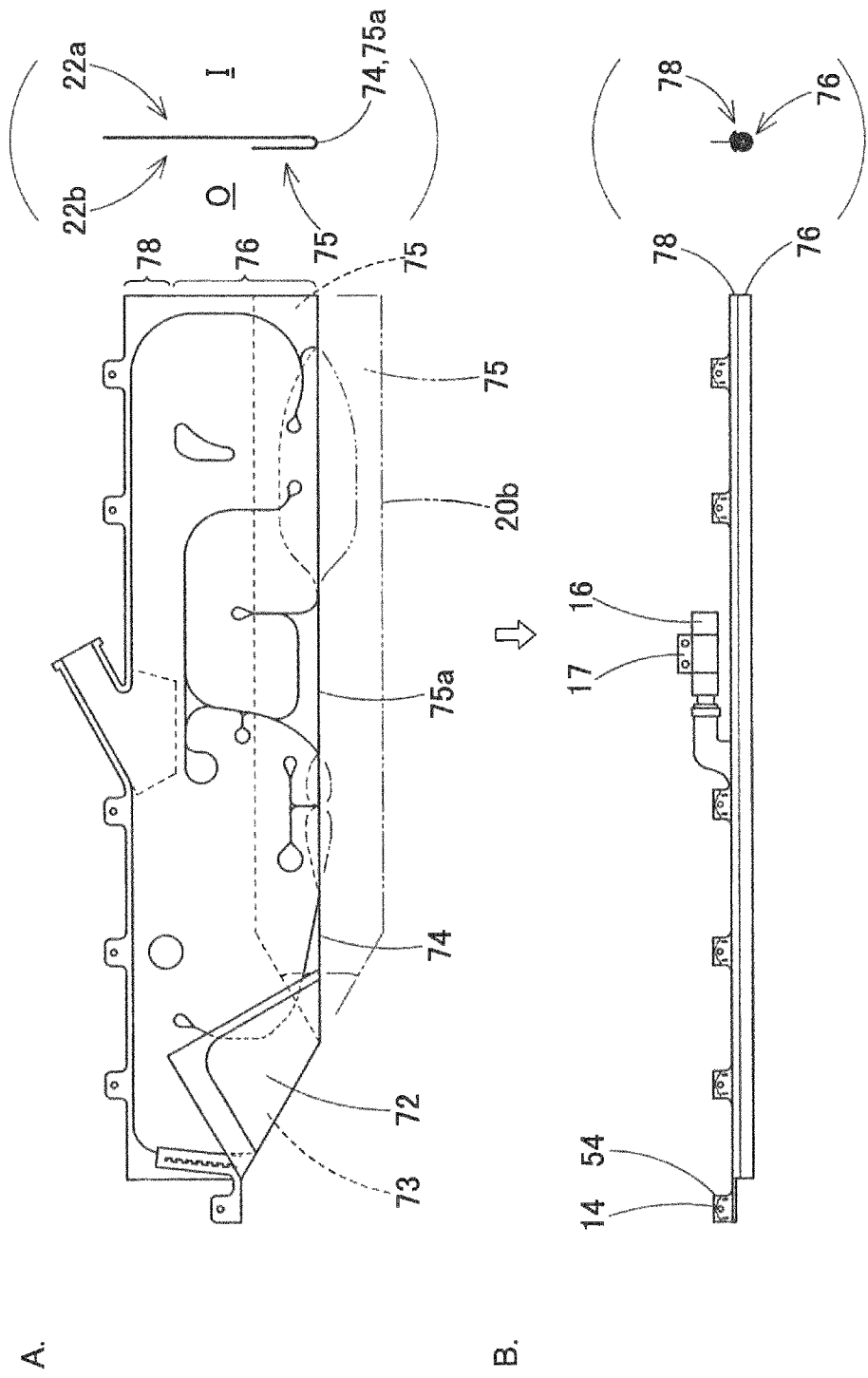
FIG. 4 illustrates the folding process of the airbag of the first embodiment, in particular, a vertical size reducing folding step.

As shown in B of FIG. 3 and A of FIG. 4, in the lower-periphery outward folding step of the vertical size reducing folding step, a lower-periphery outward fold region 75, which is disposed in the lower edge 20b of the airbag 20, is folded toward an outboard side O on a crease 74 extending in a front and rear direction.

In the outward rolling step, as shown in B of FIG. 4, the lower edge of the airbag 20 after the lower-periphery outward folding step, i.e., the lower edge 75a of the lower-periphery outward fold region 75, is roiled on the outboard side wall 22b. The area subject to the outward rolling is an area 76 from the lower edge 75a to a vicinity of an intermediate of a width in an up and down direction of the communication passage 33.

In the bellows-folding step, as shown in B of FIG. 4, an upper half area of the communication passage 33, i.e., a region 78 of the airbag 20, is folded on itself in a bellows fashion on creases extending in a front and rear direction. The bellows-folding will enable the communication passage 33 to unfold more quickly when fed with an inflation gas G, compared with an outward rolling, thus the front inflatable shielding region 27 and rear inflatable shielding region 35 will communicate quickly with the unfolded communication passage 33 and inflate swiftly.

When the folding of the airbag 20 is completed, a breakable wrapping member (not shown) is wrapped around the airbag 20 for keeping the folded-up configuration, and the inflator 16 held by the bracket 17 is connected to the inlet port 23 of the airbag 20. Then the brackets 13 are attached to the mounting portions 54 of the airbag 20. Thus an airbag module is provided.

Thereafter, the mounting portions 54 with the bracket 13 are placed at predetermined positions of the housing SP in the inner panel 2 of the vehicle body structure 1, and the bolts 14, inserted through the mounting holes 54a, are fastened into the mounting holes. Then the inflator 16 is secured to the inner panel 2 by bolt 18 fixing of the bracket 17, thus the airbag module is mounted on the vehicle body structure 1.

Subsequently, a lead wire (not shown) extending from a predetermined control device for actuating the inflator is connected to the inflator 16, and the front pillar garnish 4, roof head liner 5, middle pillar garnish 7 and rear pillar garnish 8 are attached to the vehicle body structure 1. Thus the head-protecting airbag device S is mounted on the vehicle V.

In the event of a side impact or a rollover of the vehicle V on which the head-protecting airbag device S is mounted, the inflator 16 is actuated and feeds an inflation gas G to the airbag 20, and the gas G flows as shown by double-dotted lines in FIG. 2. With the gas G, the airbag 20 inflates the communication passage 33 and protection inflatable region 26 of the gas admissive region 22, and pushes and opens the airbag cover 11, deploys downward from the upper edge WU to cover the windows W1 and W2.

When the airbag 20 admits an inflation gas G, the airbag 20 deploys from the housing SP while unfolding in a reverse fashion to the folding process. That is, the airbag 20 unfolds the bellows-folding, unrolls the outward rolling, and unfolds the lower-periphery outward folding.

At this time, as shown in A, B of FIG. 5, the front inflatable shielding region 27 of the airbag 20 unfolds the bellows-folding, unrolls the outward rolling, unfolds the lower-periphery outward folding and in the final stage of unfolding, as shown in A, B of FIG. 6, the inward fold region 72 of the sub inflatable region 29, which was folded inward, unfolds and inflates in such a manner as to overlap with the inboard side I of the vehicle body member DT disposed below the beltline BL of the window W1.

Figure 5:
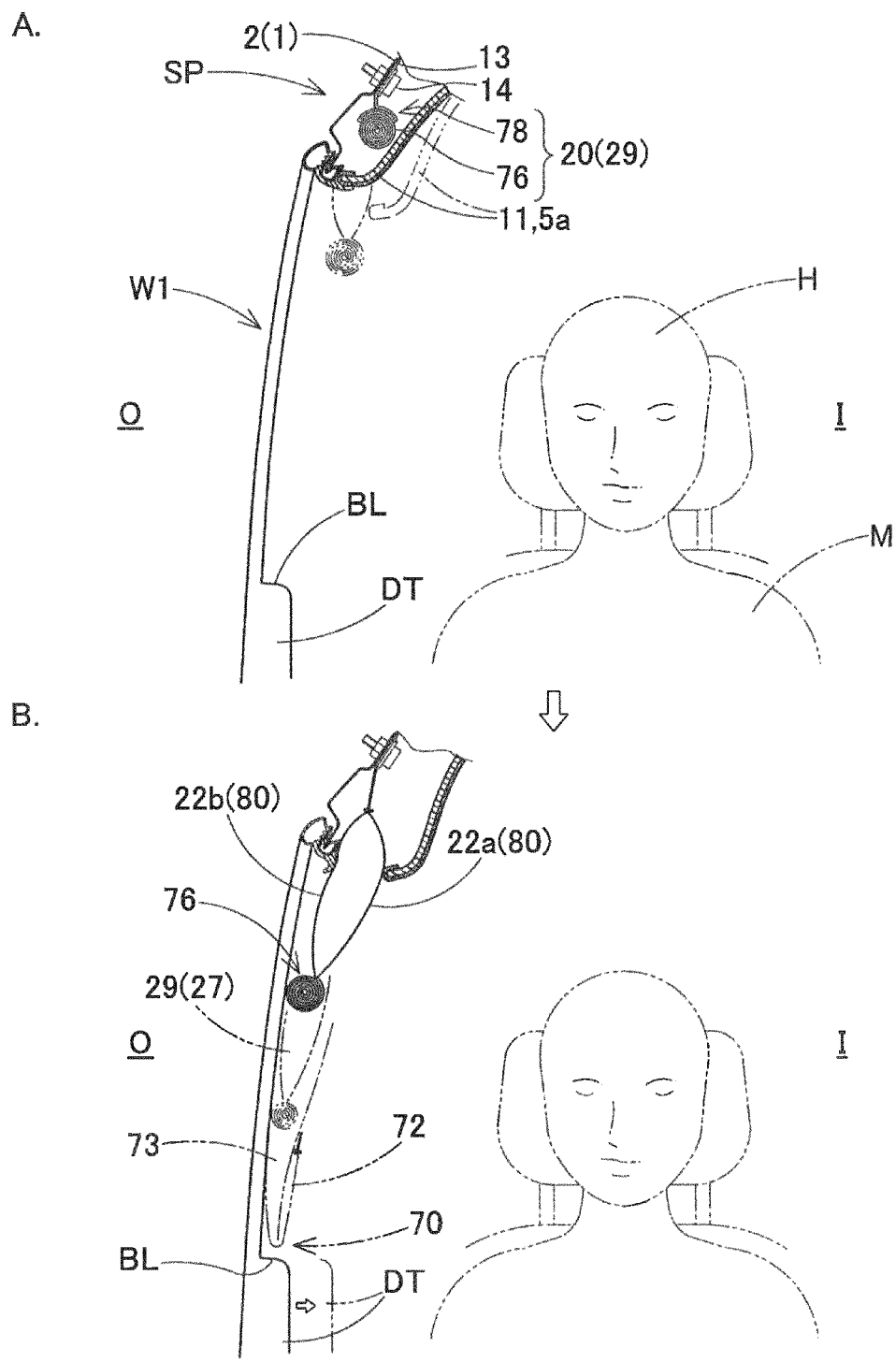
FIG. 5 shows schematic vertical sectional views showing the behavior of the head-protecting airbag device of the first embodiment at deployment, in particular, the behavior in an initial stage of deployment.

If the vehicle body member DT is pushed in or intrudes towards an inboard direction I as indicated by double-dotted lines in B of FIG. 5, the underneath region 73 disposed above the crease 70 will unfold above the beltline BL, and the inward fold region 72 will deploy at the inboard side I of the vehicle body member DT in such a manner as to undo the crease 70 as shown in A, B of FIG. 6. At this time, a region around the crease 70 may partially land on the vehicle body member DT. However, in the region forward of that region, i.e., in the region disposed to the front edge 20c of the airbag 20 relative to the region which has landed on the vehicle body member DT, the crease 70 as well as the inward fold region 72 are certainly positioned above the beltline BL. If this inward fold region 72 located above the beltline BL deploys at an inboard side I of the vehicle body member DT, the inward fold region 72 continuous with the region which has landed on the vehicle body member DT is also pulled towards an inboard side I of the vehicle body side member DT and deployed at an inboard side I of the vehicle body member DT.

As a consequence, the sub inflatable region 29 deploys at an inboard side I of the vehicle body member DT disposed below the beltline BL including the supportive inflatable region 30 at the lower end 29b, and inflates and gains thickness. Thus the front inflatable shielding region 27 of the airbag 20 will not move out of the vehicle easily and exert a desired occupant arresting performance, thereby arresting an occupant M inside the vehicle V adequately in the event of a rollover.

The region of the airbag 20 that is folded toward the inboard side wall 22a in the initial step of airbag folding is the front lower corner 31 of the sub inflatable region 29 located in front of the main inflatable region 28 of the front inflatable shielding region 27, in other words, the region to the front edge 20c of the airbag 20 located in front of the main inflatable region 28 which is inflatable in the event of a side impact of the vehicle V. With this configuration, if the head H of an occupant M is positioned close to the window W1 in the initial stage of airbag inflation in the event of a side impact, a vicinity of the front lower corner 31 of the sub inflatable region 29 will hardly engage with the head H of the occupant M. Even if part of the front lower corner area 31 of the sub inflatable region 29 should engage with the occupant M, it would be a small triangular region 32 (see B of FIG. 3) disposed at a rear region of the folded-back inward fold region 72, and the triangular region 32 will go into a space between the head H of the occupant M and the window W1 easily. As a consequence, the airbag 20 will be unfolded in the whole area up to the lower edge 20b of the front inflatable shielding region 27, and exert a good deployment property.

Therefore, with the head-protecting airbag device S and the method of folding the airbag 20 of the foregoing embodiment, the front inflatable shielding region 27 of the airbag 20 will exert a good occupant arresting property and a good deployment property in the event of a rollover of the vehicle V.

In the foregoing embodiment, the vertical size reducing folding step is mainly composed of an outward rolling, in other words, composed of such an outward rolling that a major region 76 to the lower edge 20b of the airbag 20 is rolled towards the outboard side wall 22b.

If the airbag 20 is folded up with such a vertical size reducing folding step, the airbag 20 will easily unroll along the windows W1 and W2 and exert a steady deployment property when undoing the vertical size reducing folding.

In the foregoing embodiment, moreover, prior to the outward rolling, the lower-periphery outward fold region 75 is folded over the outboard side wall 22b on the crease 74 extending in a front and rear direction. That is, the straight crease 74 extending in a front and rear direction forms the lower edge 75a of the airbag at the outward rolling. Accordingly, a jig used to help the outward rolling (in particular, a jig which suctions an entire area around the crease 74 and rolls the area) will be smoothly applied to the straight crease 74, which will facilitate the outward rolling.

In the foregoing embodiment, the crease 70 of the inward folding is formed into such a straight line that the upper end 70a is located in a vicinity of immediately below the foremost mounting portion 54F while the lower end 70b is located at the rear of the rear lower corner 29bb of the lower end 29b of the sub inflatable region 29, thus extends from immediately below the foremost mounting portion 54F and passes through the rear lower corner 29bb. The crease 70 is so formed as to locate the front lower corner 31 at a vicinity of an intermediate between the beltline BL and the upper edge 20a of the airbag 20 and as to secure a wide area of the inward fold region 72 in an area of the sub inflatable region 29. However, the inward folding will be sufficient if the front lower corner 31 of the sub inflatable region 29 is located at such a position of the airbag 20 as flatly unfolded as to be deployable above the beltline BL such that the inward fold region 72 be deployable at an inboard side I of the vehicle body member DT when the airbag unfolds at deployment. To this end, by way of example, the crease 70 may be so formed as to extend obliquely rearward and downward at an inclination angle of 45° from the front edge 20c to the lower edge 20b so as to locate the lower end 70b at a vicinity of an intermediate in a front and rear direction of the sub inflatable region 29.

However, with the configuration of the foregoing embodiment in which the crease 70 is formed into a straight line that extends from immediately below the foremost mounting portion 54F and passes through the rear lower corner 29bb so as not to fold the main inflatable region 28 and so as to secure a wide area of the inward fold region 72 in an area of the sub inflatable region 29, even in an instance where an intruding amount of the vehicle body member DT in the event of a side impact is great, the sub inflatable region 29 will be able to deploy the supportive inflatable region 30 at an inboard side I of the vehicle body member DT.

Although the airbag 20 described in the foregoing embodiment is a cut-and-sewn airbag, an airbag formed by one-piece woven technology may also be employed as the airbag 20 of the invention.

DESCRIPTION OF REFERENCE NUMERALS

1 . . . (vehicle body) body,
20 . . . airbag,
20b . . . lower edge,
20c . . . front edge,
22a . . . inboard side wall,
22b . . . outboard side wall,
27 . . . front inflatable shielding region,
28 . . . main inflatable region (primary inflatable region),
29 . . . sub inflatable region (secondary inflatable region),
29b . . . lower end,
30 . . . supportive inflatable region,
31 . . . front lower corner,
70 . . . crease,
72 . . . inward fold region,
76 . . . outwardly-rolled region,
V . . . vehicle,
W1 . . . window (side window),
WU . . . upper periphery,
SP . . . housing,
BL . . . beltline,
DT . . . door trim (vehicle body member),
I . . . inboard side,
O . . . outboard side,
G . . . inflation gas,
M . . . occupant,
H . . . head, and
S . . . head-protecting airbag device.

The invention claimed is:

1. A head-protecting airbag device comprising a housing adapted to be mounted on an upper periphery of a window disposed at a side of a front seat of a vehicle and an airbag that is stored in the housing in such a configuration that is folded up through a vertical size reducing folding that brings a lower edge of the airbag as unfolded flatly close to an upper edge of the airbag, the airbag comprising a front inflatable shielding region that is inflatable with an inflation gas fed from an inflator in such a manner as to separate an inboard side wall and an outboard side wall while unfolding downward from the housing for covering an inboard side of the window, the front inflatable shielding region comprising a main inflatable region and a sub inflatable region that is disposed in front of the main inflatable region and is in communication with the main inflatable region and completes inflation after the main inflatable region has completed inflation, the sub inflatable region comprising at a lower end thereof as fully inflated a supportive inflatable region that is deployable at and supported by an inboard side of a vehicle body member of the vehicle which is disposed below a beltline of the window at full inflation of the airbag, wherein:

prior to the vertical size reducing folding, the airbag has been subjected to an inward folding that folds a front lower corner of the sub inflatable region as unfolded flatly on a crease extending obliquely rearward and downward from a front edge to the lower edge of the airbag and locates the front lower corner of the sub inflatable region at a position on an inboard side of the inboard side wall deployable above the beltline.

2. The head-protecting airbag device as set forth in claim 1 wherein the vertical size reducing folding is mainly composed of an outward rolling that rolls a region of the airbag in a vicinity of the lower edge towards the outboard side wall.

3. The head-protecting airbag device as set forth in claim 2 wherein, prior to the outward rolling in the vertical size reducing folding, a lower peripheral region of the airbag having been subjected to the inward folding is folded towards the outboard side wall on a crease extending in a front and rear direction.

4. The head-protecting airbag device as set forth in claim 2 wherein:

the airbag further comprises a rear inflatable shielding region that is disposed at the rear of the front inflatable shielding region and a communication passage that is disposed in the upper edge at a vicinity of a center in a front and rear direction of the airbag as fully inflated and provides communication between the front inflatable shielding region and the rear inflatable shielding region; and an upper half area in an up and down direction of the communication passage is folded up in a bellows fashion on creases extending in a front and rear direction.

5. The head-protecting airbag device as set forth in claim 1 wherein:

the airbag further comprises at the upper edge thereof a plurality of mounting portions adapted to be mounted on a vehicle body member disposed at the upper periphery of the window;

a foremost mounting portion out of the mounting portions is located at the front edge of the airbag; and the crease of the inward folding is formed into such a straight line that an upper end thereof is located in a vicinity of immediately below the foremost mounting portion while a lower end thereof is located at the rear of a rear lower corner of a lower end of the sub inflatable region, thus extends from immediately below the foremost mounting portion and passes through the rear lower corner of the lower end of the sub inflatable region.

6. The head-protecting airbag device as set forth in claim 1 wherein the crease of the inward folding is so formed as to extend obliquely rearward and downward from the front edge to the lower edge of the airbag at an inclination angle of 45°.

7. A method of folding an airbag for use in a head-protecting airbag device having a housing adapted to be mounted on upper peripheries of windows at a side of a front seat and a rear seat of a vehicle, in order to store the airbag in the housing, the airbag comprising:

a front inflatable shielding region and a rear inflatable shielding region that are inflatable with an inflation gas fed from an inflator in such a manner as to separate an inboard side wall and an outboard side wall while unfolding downward from the housing for covering an inboard side of the windows at a side of the front seat and rear seat, the front inflatable shielding region including a main inflatable region and a sub inflatable region that is disposed in front of the main inflatable region and is in communication with the main inflatable region and completes inflation after the main inflatable region has completed inflation, the sub inflatable region including at a lower end thereof as fully inflated a supportive inflatable region that is deployable at and supported by an inboard side of a vehicle body member which is disposed below a beltline of the window at full inflation of the airbag; and a communication passage that is disposed in an upper edge at a vicinity of a center in a front and rear direction of the airbag as fully inflated and provides communication between the front inflatable shielding region and the rear inflatable shielding region, the method of folding comprises:

a vertical size reducing folding step that brings a lower edge of the airbag as unfolded flatly close to the upper edge of the airbag; and an inward folding step that is conducted prior to the vertical size reducing folding step and folds a front lower corner of the sub inflatable region as unfolded flatly on a crease extending obliquely rearward and downward from a front edge to the lower edge of the airbag and locates the front lower corner of the sub inflatable region at a position on an inboard side of the inboard side wall deployable above the beltline.

8. The method of folding an airbag as set forth in claim 7 wherein the vertical size reducing folding step is mainly composed of an outward rolling step that rolls a region of the airbag in a vicinity of the lower edge towards the outboard side wall.

9. The method of folding an airbag as set forth in claim 8 wherein the outward rolling step is applied to an area of the airbag from the lower edge to a vicinity of a center of a width in an up and down direction of the communication passage.

10. The method of folding an airbag as set forth in claim 8 wherein the vertical size reducing folding step further comprises prior to the outward rolling a lower-periphery outward folding step that folds a lower peripheral region of the airbag having been subjected to the inward folding towards the outboard side wall on a crease extending in a front and rear direction.

11. The method of folding an airbag as set forth in claim 7 wherein the vertical size reducing folding step further comprises a bellows-folding step that folds up an upper half area of the communication passage in a bellows fashion on creases extending in a front and rear direction.

12. The method of folding an airbag as set forth in claim 7, wherein:

the vertical size reducing folding step further comprises a bellows-folding step that folds up an upper half area of the communication passage in a bellows fashion on creases extending in a front and rear direction; and the vertical size reducing folding step is mainly composed of an outward rolling step that rolls a region of the airbag in a vicinity of the lower edge towards the outboard side wall.

13. The method of folding an airbag as set forth in claim 12, wherein the outward rolling step is applied to an area of the airbag from the lower edge to a vicinity of a center of a width in an up and down direction of the communication passage.

14. The method of folding an airbag as set forth in claim 12, wherein the vertical size reducing folding step further comprises prior to the outward rolling a lower-periphery outward folding step that folds a lower peripheral region of the airbag having been subjected to the inward folding towards the outboard side wall on a crease extending in a front and rear direction.

* * * * *